US007403372B2

(12) United States Patent
Reed et al.

(10) Patent No.: US 7,403,372 B2
(45) Date of Patent: Jul. 22, 2008

(54) MULTIPLE FUSED JUNCTION WITH BLOWN FUSE INDICATION

(75) Inventors: Anthony Reed, Port Murry, NJ (US); Larry Siebens, Asbury, NJ (US); Frank M. Stepniak, Cape May, NJ (US); Timothy Taylor, Easton, PA (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/712,179

(22) Filed: Feb. 28, 2007

(65) Prior Publication Data

US 2008/0117568 A1 May 22, 2008

Related U.S. Application Data

(60) Provisional application No. 60/860,600, filed on Nov. 22, 2006.

(51) Int. Cl.
*H02B 1/26* (2006.01)
*H01H 85/143* (2006.01)
*H01H 85/30* (2006.01)

(52) U.S. Cl. ........................ 361/626; 361/622; 361/837; 337/237; 337/241; 337/244

(58) Field of Classification Search ................. 361/601, 361/611, 614, 622, 624, 626, 641–642, 657, 361/675, 833, 835, 837; 337/187, 237, 241, 337/244, 265, 267; 174/88 S
See application file for complete search history.

(56) References Cited

U.S. PATENT DOCUMENTS 2,222,642 A * 11/1940 Xenis ......................... 337/192
2,259,053 A * 10/1941 Xenis ......................... 337/159
2,267,006 A * 12/1941 Xenis ......................... 337/188
2,289,207 A * 7/1942 Papp .......................... 337/158
2,543,245 A 2/1951 Laing
3,593,249 A 7/1971 Sedgwick
3,678,430 A 7/1972 Gaia
4,025,888 A 5/1977 Judd et al.
4,058,784 A 11/1977 Gaia (Continued)

FOREIGN PATENT DOCUMENTS

JP 2000166072 A * 6/2000

(Continued)

*Primary Examiner*—Jayprakash N Gandhi
*Assistant Examiner*—Robert J Hoffberg
(74) *Attorney, Agent, or Firm*—Hoffman & Baron, LLP

(57) ABSTRACT

A multiple fused junction with blown fuse indication which generally includes a main body, a fuse connected to the main body and a switch disposed within the main body. The main body has multiple cable ports extending outwardly therefrom. At least one of the ports is adapted for electrical connection with a feeder cable and another of the ports is adapted to receive a fuse. The fuse is removably connected to the fuse port of the main body and has an indicator rod movably disposed therein, which protrudes from an axial end of the fuse into the main body upon electrical interruption of the fuse. The switch is disposed within the main body adjacent the fuse port and is activated by the indicator rod of the fuse upon protrusion of the rod from the fuse to provide indication of electrical interruption of the fuse.

17 Claims, 7 Drawing Sheets

U.S. PATENT DOCUMENTS

| | | | |
|---|---|---|---|
| 4,443,780 | A | 4/1984 | Huai-Chieh |
| 4,492,945 | A | 1/1985 | Jou et al. |
| 4,506,249 | A | 3/1985 | Huber et al. |
| 5,604,474 | A | 2/1997 | Leach et al. |
| 5,659,283 | A | 8/1997 | Arratia |
| 5,739,737 | A | 4/1998 | Hatton |
| RE36,317 | E | 9/1999 | Arratia |
| 6,456,203 | B1 | 9/2002 | Schomaker et al. |
| 6,617,974 | B2 | 9/2003 | Stanek |
| 6,771,079 | B2 | 8/2004 | Lin |
| 6,859,131 | B2 | 2/2005 | Stanek et al. |
| 6,873,510 | B2 | 3/2005 | Schomaker et al. |
| 6,998,954 | B2 | 2/2006 | Milanczak |
| 2008/0042796 | A1 * | 2/2008 | Moffat ....................... 337/237 |

FOREIGN PATENT DOCUMENTS

| | | | | |
|---|---|---|---|---|
| JP | 2000295754 | A | * | 10/2000 |
| SU | 1367081 | A | * | 1/1988 |

* cited by examiner

FIG. 9
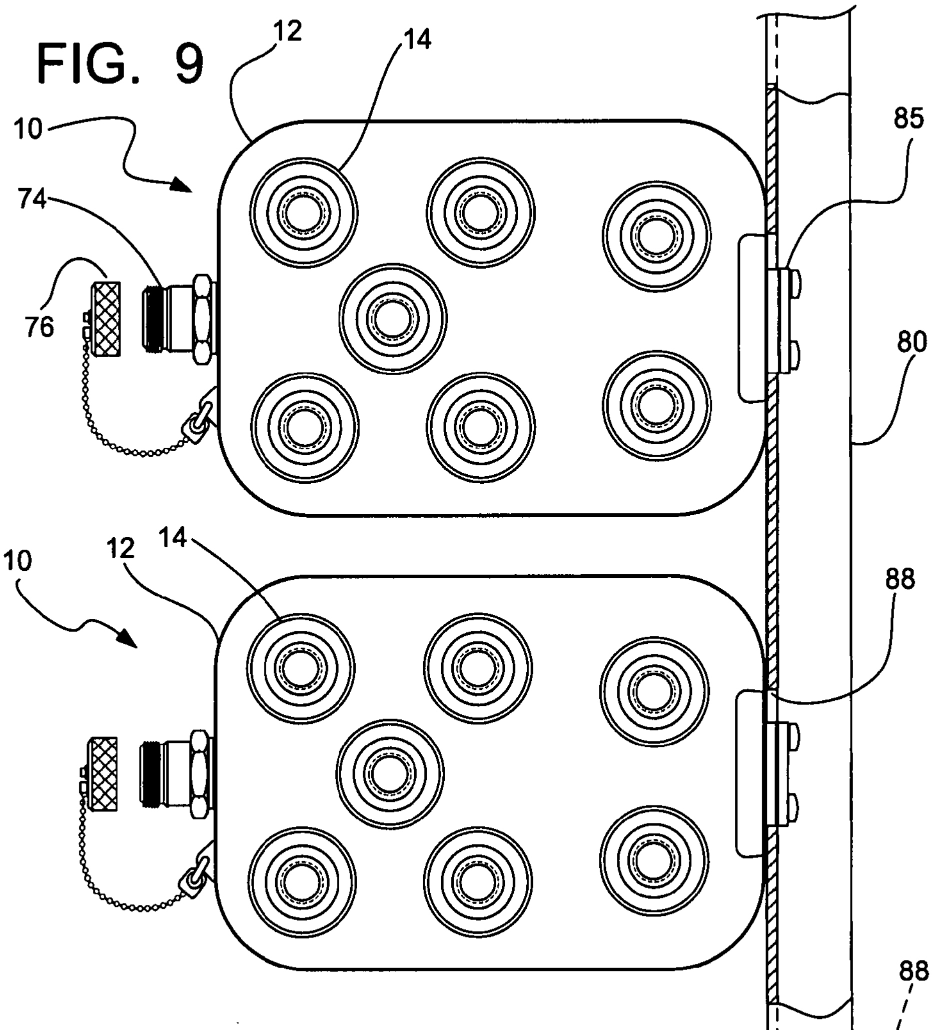
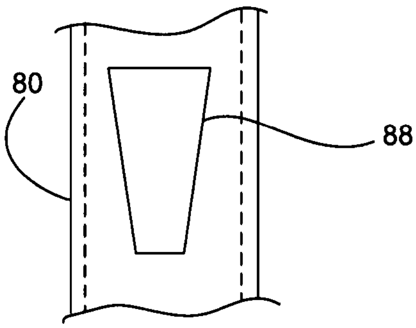
FIG. 10

MULTIPLE FUSED JUNCTION WITH BLOWN FUSE INDICATION

CROSS-REFERENCE TO RELATED APPLICATIONS

This application claims the benefit of U.S. Provisional Application No. 60/860,600, filed on Nov. 22, 2006.

FIELD OF THE INVENTION

The present invention relates to electrical cable junctions for power distribution systems, and more particularly to a multiple cable junction for distributing low voltage power from a main feeder to multiple cable taps.

BACKGROUND OF THE INVENTION

Connections in urban medium and low-voltage underground power distribution systems, such as between cables and transformers, are generally accomplished with some form of multiple cable junction. Such multiple cable junctions typically distribute medium or low voltage from a main feeder cable to multiple cable taps, which in turn routes power to multiple users. Conventional cable junctions for this purpose, known in the field as "junction crabs," generally consist of a unitary mass of epoxy enclosing an electrically conductive network therein and having multiple tap branches extending therefrom and fusible elements for each branch integrally molded therein. Thus, each branch includes a permanently connected fuse link, which is typically hard-wire connected to a respective tap cable.

A typical urban utility experiences approximately 1,500 failures on its network feeders each year. Such network failures are often caused by power surges in the system, which may result in one or more of the fuse elements within the "crab" being blown. Since there is no indication provided with such conventional junctions, the first problem in correcting the network failure is to find the blown fuse. The circuit configuration for most utility networks is designed to maintain service to the maximum number of customers during faults by having multiple sources and fused junctions. This makes the location of a blown fuse difficult. In addition, contamination from the blown fuse link often provides false readings when typical voltage or continuity measurements are attempted.

The second problem is replacement. As described above, conventional construction of multiple cable junctions is based on permanently connected fuse links. Therefore, if any one of the fuse links blows, the feeder cable feeding the junction must first be deenergized and the entire defective junction must be cut out of the circuit and a new unit spliced in. This means that the multiple users fed by the feeder cable remain out of service while the junction is replaced. Each feeder outage duration is directly proportional to the risk of power customer interruption and the stress experienced by other feeders and transformers in the network. Obviously, this conventional procedure results in undesirable long system outage time.

Accordingly, it would be desirable to provide a multiple cable junction for distributing low voltage power from a main feeder to multiple cable taps, wherein the junction provides indication for individual blown fuses and wherein a blown fuse can be easily replaced without substantially disrupting service to the other tap branches.

SUMMARY OF THE INVENTION

The present invention is a multiple fused junction with blown fuse indication. The junction generally includes a main body, a fuse connected to the main body and a switch disposed within the main body. The main body has multiple cable ports extending outwardly therefrom. At least one of the ports is adapted for electrical connection with a feeder cable and another of the ports is adapted to receive a fuse. The fuse is removably connected to the fuse port of the main body and has an indicator rod movably disposed therein, which protrudes from an axial end of the fuse into the main body upon electrical interruption of the fuse. The switch is disposed within the main body adjacent the fuse port and is activated by the indicator rod of the fuse upon protrusion of the rod from the fuse to provide indication of electrical interruption of the fuse.

In a preferred embodiment, the main body further includes an interrogation port in communication with the switch and adapted for connection with a detection device for determining a status of the switch. Also, the fuse port is preferably adapted for removable connection of the fuse without use of tools. Similarly, the junction further preferably includes a tap cable connector having one end fixed to a tap cable and an opposite end removably connected to the fuse. The tap connector permits removable attachment of the tap cable to the fuse without use of tools. The main body also preferably includes a submersible insulative outer jacket and a built-in bracket for mounting to an existing wall bracket.

A preferred form of the multiple fused junction with blown fuse indication, as well as other embodiments, objects, features and advantages of this invention, will be apparent from the following detailed description of illustrative embodiments thereof, which is to be read in conjunction with the accompanying drawings.

BRIEF DESCRIPTION OF THE DRAWINGS

FIG. 9 is a side view of an arrangement of two multiple fused junctions according to the present invention mounted to a wall bracket as may be found in a typical vault installation of a utility network.

FIG. 10 is a detailed front view of one of the wall bracket cutouts in which the multiple fused junction of the present invention is mounted.

DETAILED DESCRIPTION OF ILLUSTRATIVE EMBODIMENTS

Figure 1:
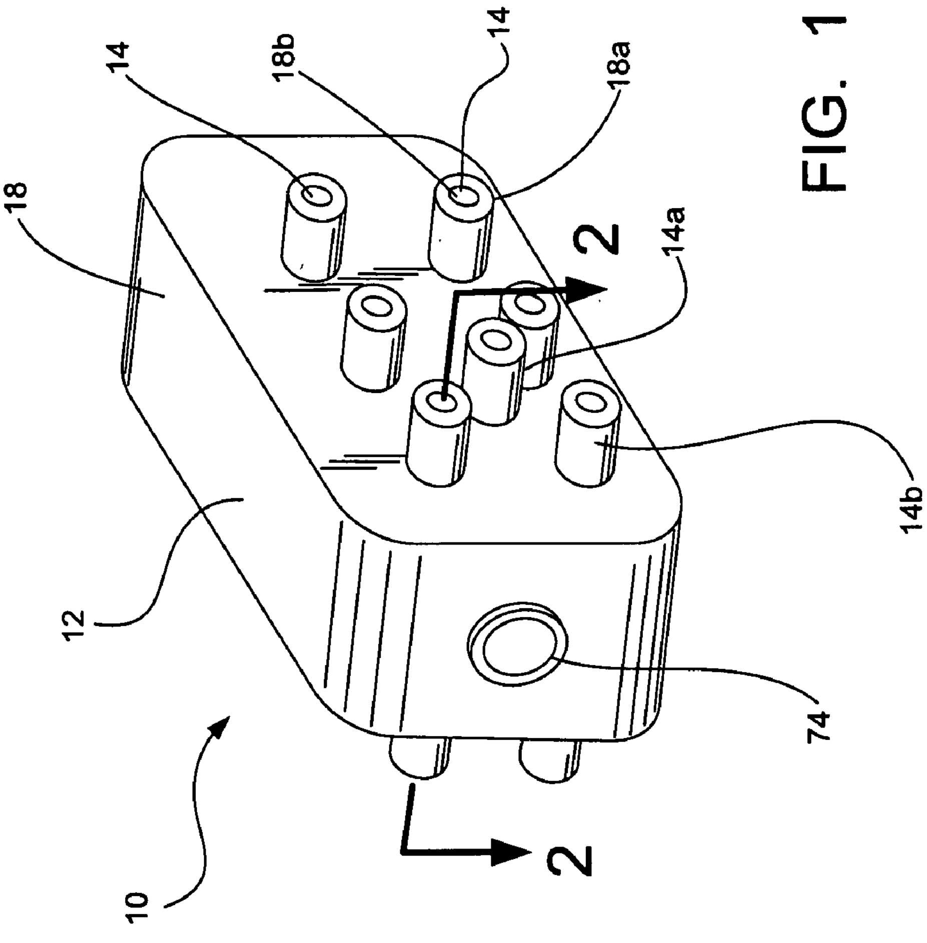
FIG. 1 is a top perspective view of the multiple fused junction according to the present invention.
Figure 2:
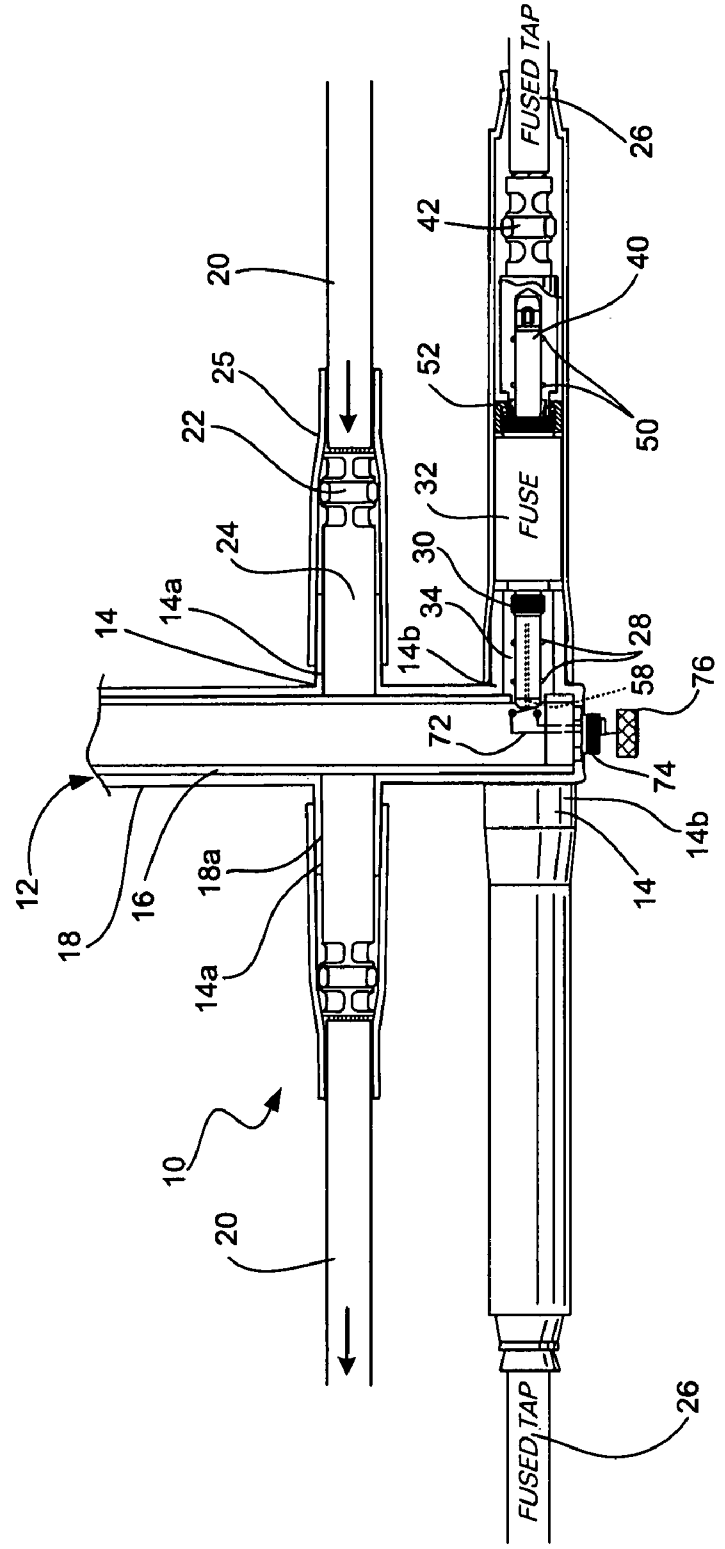
FIG. 2 is a cross-sectional view of a part of the multiple fused junction shown in FIG. 1, taken along the line 2-2.
Figure 3:
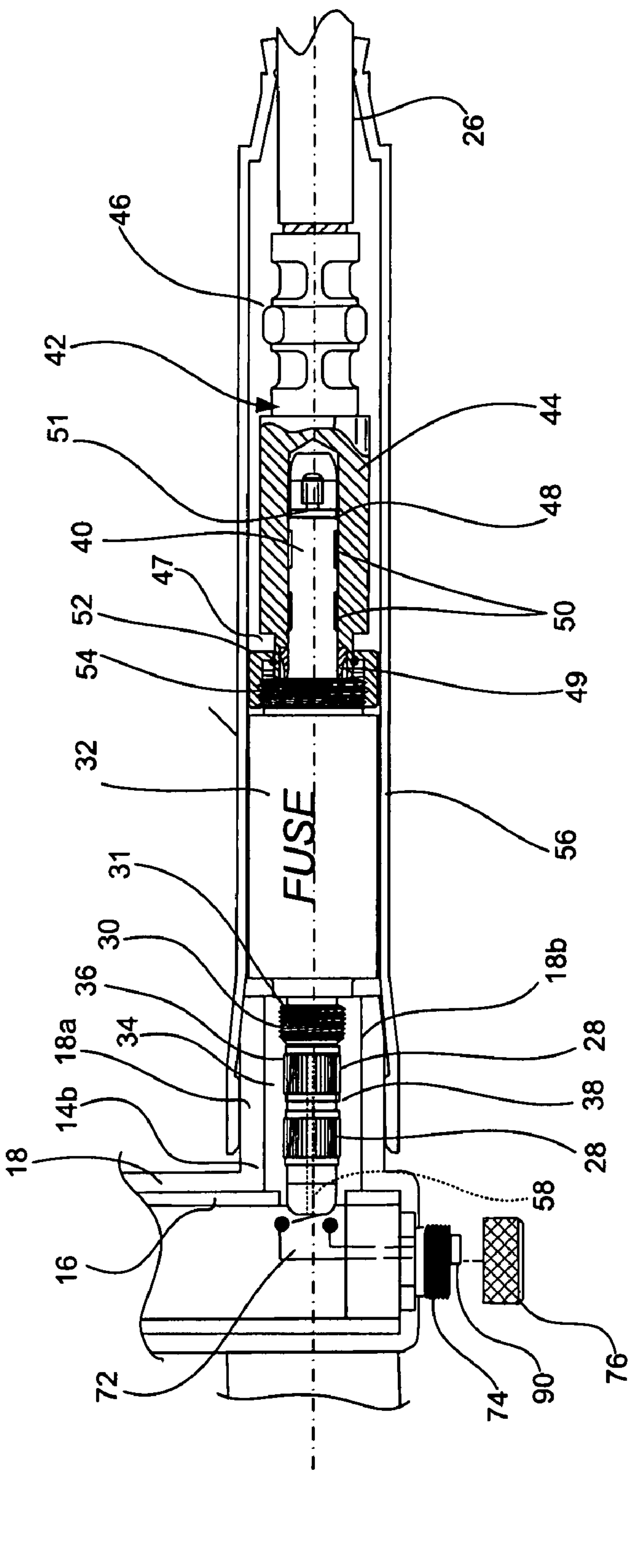
FIG. 3 is an enlarged cross-sectional view of the tap port of the junction shown in FIG. 2.
Figure 8:
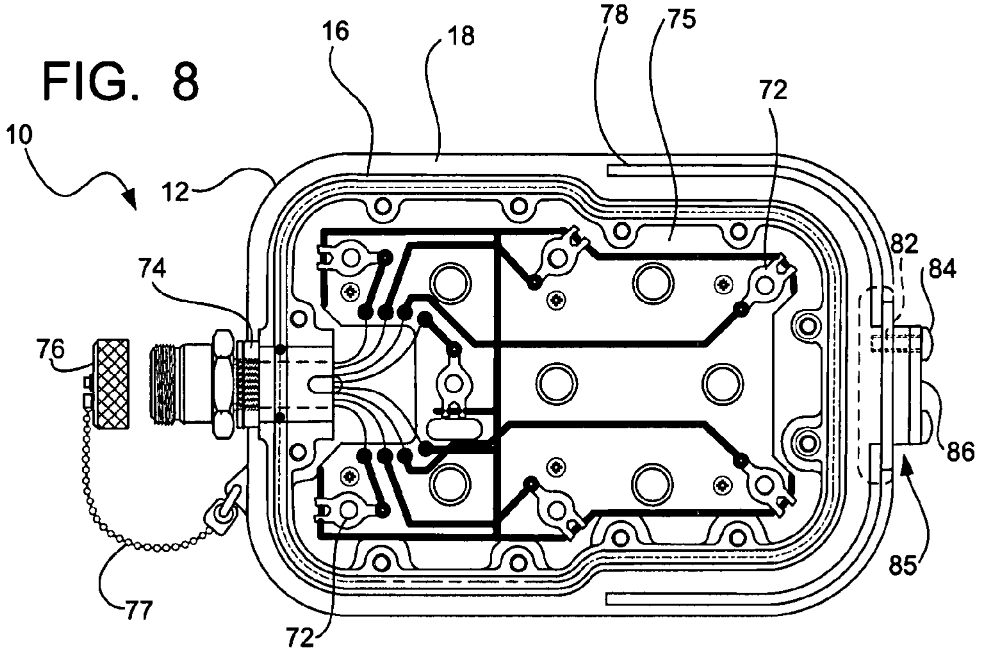
FIG. 8 is a cross-sectional view of the multiple fused junction shown in FIG. 7 taken along line 8-8.

Referring first to FIGS. 1 and 2, the multiple fused junction 10 of the present invention is shown. The junction 10 generally includes a main body 12 having multiple cable ports 14 extending outwardly therefrom. As also shown in FIGS. 3 and 8, the main body 12 preferably includes an internal conductive shell 16 encapsulated within an insulative outer jacket 18. The internal conductive shell 16 is made from an electrically conductive material, such as copper, and is adapted to conduct electricity between the multiple cable ports 14 of the main body 12. The insulative jacket 18 is made from an electrically non-conductive material, such as rubber or plastic, to provide electrical insulation and a watertight seal to the main body 12. The jacket 18 is preferably rated to 600 volts.

The junction 10 can take various shapes and can include any number of closely spaced ports 14 extending from various sides. In a preferred embodiment, the junction 10 has 3, 5 or 7 ports 14 protruding from opposite sides, representing a three-way, five-way, or seven-way cable limiter. The ports 14 may be made by forming protruding boss portions 18*a* of the insulative jacket 18 so that the insulative jacket takes the form of a tree having multiple branches extending outwardly from a central trunk portion. Each of the boss portions 18*a* is tubular in shape and includes an internal bore 18*b* to permit access to the internal conductive shell 16. Also, the conductive shell 16 may include protruding branch sections (not shown) to form part of the ports 14.

Referring specifically to FIG. 2, one of the ports 14*a* on each side of the main body 12 is adapted for connection with a feeder cable 20, which feeds power to the junction from the utility system network. The feeder cable 20 is preferably attached to the main body 12 through the use of a feeder crimp connector 22 or a solid disconnectable element. In the case of a crimp connector 22, the connector is fixed at one end to the end of the feeder cable 20 by crimping and is connectable and disconnectable at its opposite end to the internal copper shell 16 of the main body 12. In this regard, the feeder crimp connector 22 may also include a conductive extension 24, which extends into the internal bore 18*b* of the insulative jacket 18 to electrically connect the feeder cable 20 to the internal copper shell 16.

The feeder crimp connector 22 is sheathed within an insulative feeder sleeve 25, which preferably extends in the feeder cable direction to slip over a sufficient length of the outer surface of the feeder cable 20. In the opposite direction, the feeder sleeve 25 extends a sufficient length to substantially slip over the protruding boss portion 18*a* of the insulative jacket forming the feeder branch 14*a*. The feeder sleeve 25 is preferably made from a durable rubber, and is preferably electrically rated to 600 volts. The feeder sleeve 25 provides a water-tight and contaminant-free seal between the feeder cable 20 and the junction main body 12.

Figure 4:
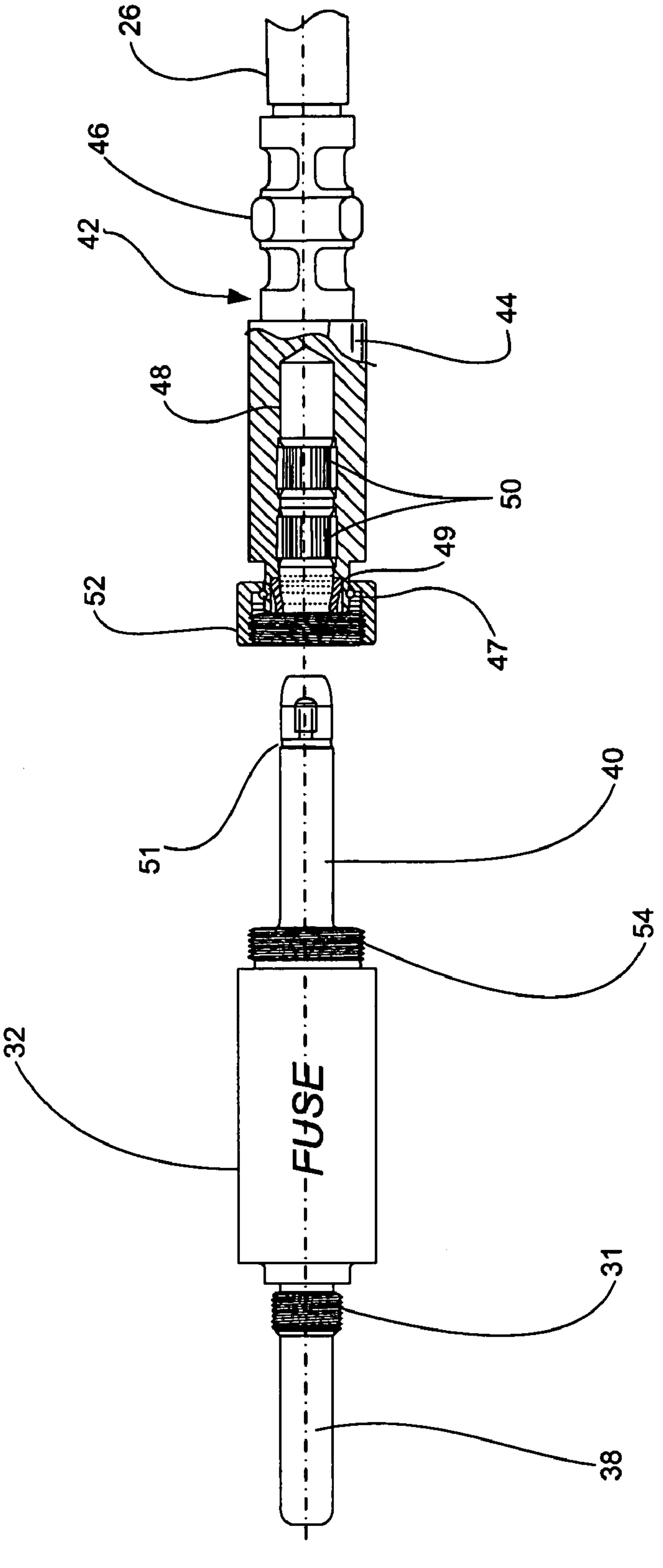
FIG. 4 is a cross-sectional view of a fuse and a tap cable disconnected.

The remaining ports of the main body 12 are designated as tap branches 14*b* and are adapted to distribute power from the feeder cable 20 to multiple tap cables 26. Referring additionally to FIGS. 3 and 4, disposed within the internal bore 18*b* of each tap branch 14*b* is a fuse connector 34. As mentioned above, the conductive shell 16 can include protruding branch sections at each tap branch 14*b* which form the fuse connectors 34. Thus, in this embodiment, the fuse connector 34 is integral with the conductive shell 16. However, in a preferred embodiment, the fuse connector 34 is a tubular conductive member fixed at one end to the internal conductive shell 16 via, for example, a threaded connection. The fuse connector 34 is formed with an internal bore 36 formed therethrough, which communicates with the interior of the conductive shell 16 and is sized to receive a first end terminal 38 of a replaceable fuse 32.

The fuse connector 34 can be provided with one or more annular contacts 28 fixed within the internal bore 36, which permit reliable electrical connection between the first end terminal 38 of the fuse 32 and the fuse connector 34. The internal bore 36 of the fuse connector 34 further preferably includes an internally threaded portion 30, which threadably engages an external threaded collar portion 31 provided on the first end terminal 38 of the fuse 32 to mechanically secure the fuse to the connector 34. With such a threaded connection between the fuse 32 and the fuse connector 34, the annular contacts 28 can be omitted, whereby electrical contact is provided via the threaded connection.

The tap cable 26 is attached to an opposite second end terminal 40 of the fuse 32 through the use of a tap cable connector 42. The tap cable connector 42 preferably includes a tubular body portion 44 and a crimping portion 46 attached to the body portion. The crimping portion 46 is crimped over the bare end of a tap cable 26 to secure the connector 42 thereto in a conventional manner. The tubular body portion 44 includes an open fuse terminal receiving end 47 and an internal bore 48 formed therein for receiving the second end terminal 40 of the fuse 32. Fixed within the internal bore 48 of the tubular body portion 44 are one or more second annular contacts 50 for ensuring electrical contact between the second end terminal 40 of the fuse 32 and the tap cable 26 via the tap connector 42.

In a preferred embodiment, a female arc contact 49 is also fixed within the internal bore 48 of the tubular body portion 44. The arc contact 49 is made from an arc resistant material, such as copper tungsten or other similar material, and is in the form of an annular ring. The arc contact 49 is preferably press-fit into the internal bore 48 of the tubular body portion 44 at the open end 47 thereof and is sized to receive the second end terminal 40 of the fuse 32.

A cooperating arc resistant ring 51 is provided on the second end terminal 40 of the fuse 32. This annular ring 51 is also made from an arc resistant material, such as copper tungsten, and is preferably press fit around the circumferential surface of the second end terminal 40 of the fuse 32 adjacent a distal end thereof.

The arc resistant contact 49 and ring 51 provide arc protection when connecting the tap cable 26 to the fuse 32 under load. In particular, upon connecting the tap connector 42 of the tap cable 26 to a live fuse 32, the arc will be drawn to the contact 49 and the ring 51 until these parts overlap, at which point the current will flow from the ring 51 of the fuse end terminal 40 to the contact 49 of the tap connector 42. As the second end terminal 40 of the fuse 32 is further inserted into the internal bore 48 of the tap connector 42, the current is transferred to the second annular contacts 50. Thus, a smooth transition is provided.

The tubular body portion 44 further preferably includes an internally threaded collar 52, which is threadably attached to an externally threaded end portion 54 of the fuse 32 to ensure that the tap connector 42 and the fuse do not separate. The threaded collar 52 is preferably rotatably attached to the outer surface of the end 47 of the tubular body portion 44 to permit connection of the tap cable connector 42 to the fuse 32 without twisting the tap cable 26.

Like the feeder connector 22 described above, the fuse 32 and the tap connector 42 are sheathed within an insulative tap sleeve 56, which preferably extends in the tap cable direction to slip over a sufficient length of the outer surface of the tap cable 26. In the opposite direction, the tap sleeve 56 extends a sufficient length to substantially slip over the protruding boss portion 18*a* of the insulative jacket 18 forming the tap branch 14*b*. The tap sleeve 56 is also preferably made from a durable rubber rated to 600 volts and provides a water-tight and contaminant-free seal between the tap cable 26 and the junction main body 12.

Figure 5:
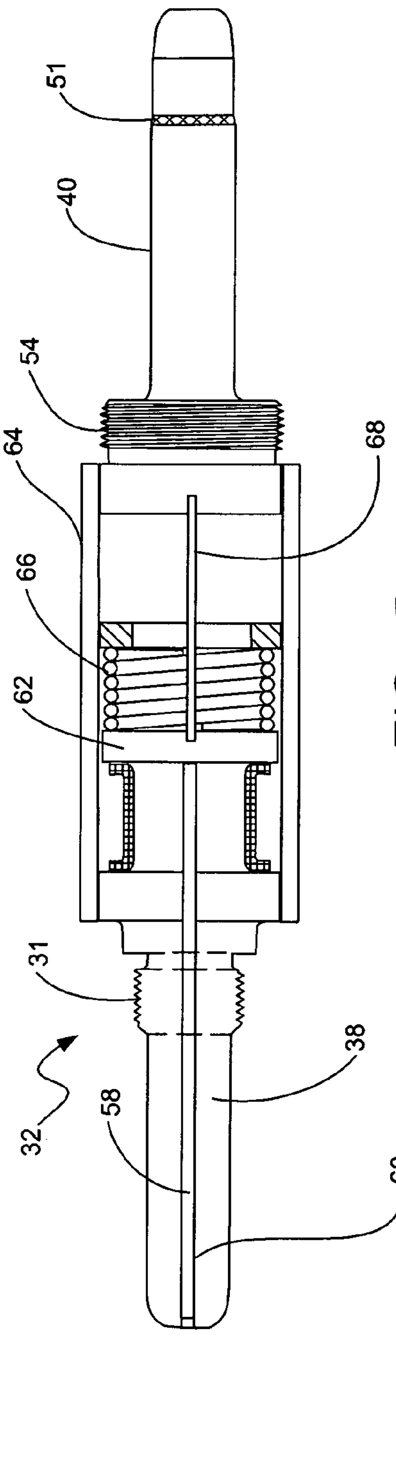
FIG. 5 is a cross-sectional view of an exemplary embodiment of a fuse used in conjunction with the present invention, shown in its operating condition.
Figure 6:
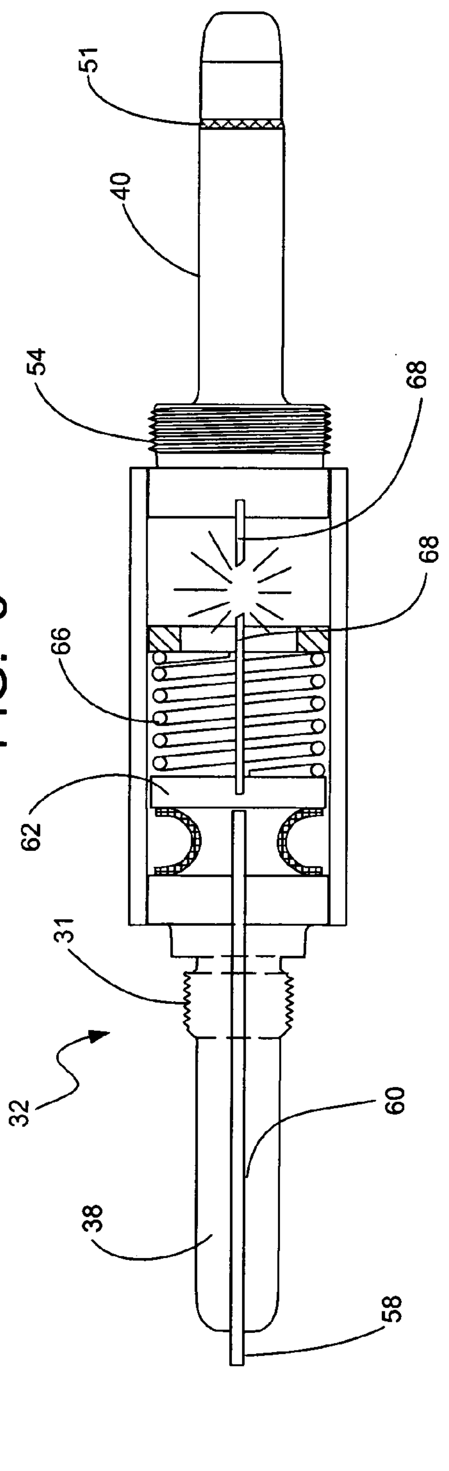
FIG. 6 is a cross-sectional view of the exemplary fuse shown in FIG. 5 in a blown condition.
Figure 7:
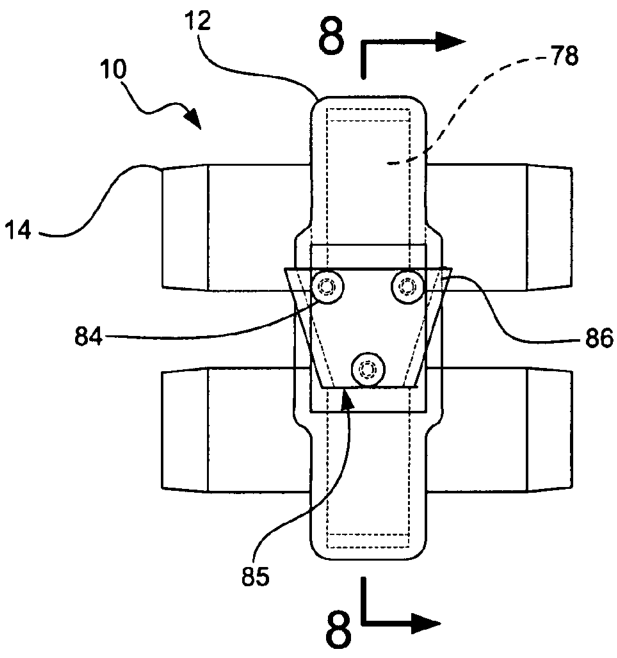
FIG. 7 is a back plan view of the multiple fused junction according to the present invention.

Referring now to FIGS. 5 and 6, the fuse 32 used in the present invention is adapted to provide mechanical indication when the fuse is blown. In this regard, the fuse 32 may include a spring loaded, insulated indicator rod 58 slidably received within a bore 60 formed within the first end terminal 38 of the fuse. The indicator rod 58 may include a shoulder portion 62 disposed within the fuse housing 64, which is biased by a spring 66. A fusible element 68 is fixed between the shoulder portion 62 and the opposite second end terminal 40, thereby completing an electrical path between the first and second end terminals. As shown in FIG. 6, once the fuse element 68 melts due to an over-current condition, the loaded spring 66 will move the shoulder portion 62 away from the second end terminal 40 toward the first end terminal 38. This in turn moves the indicator rod 58 through the bore 60 of the first end terminal 38 so that the end of the rod protrudes out of the end of the first terminal. The rod 58 may be provided with a rounded button (not shown) at its protruding end to facilitate contact with a switch 72, as will be discussed in further detail below.

As will be appreciated by one skilled in the art, the fuse 32 described above is but one example of a fuse suitable for use with the present invention. Other mechanically driven indicator fuses are known in the art and may also be used with the present invention. One particularly suitable fuse for the present invention is described in the commonly owned U.S. patent application titled "Fuse Providing Circuit Isolation and Visual Interruption Indication" by John G. Leach, concurrently filed herewith and based on U.S. provisional application Ser. No. 60/860,613, filed Nov. 22, 2006, and the specification of which is incorporated herein by reference.

As mentioned above, when the fuse 32 has blown, the indicator rod 58 will extend out of the center of the first end terminal 38. With the fuse 32 positioned in the tap port 14*b* as described above and shown in FIG. 3, such extension of the indicator rod 58 will protrude through the inner conductive shell 16 of the main body 12. When this extension occurs, the indicator rod 58 engages a status switch 72 to change the state of the switch.

Specifically, a status switch 72 is positioned within the interior shell 16 adjacent each port 14, as shown in FIG. 8, to engage the indicator rod 58 of its respective fuse 32 when the fuse has blown. The status switch 72 can be any conventional electrical device which is capable of changing state upon extension of the fuse indicator rod 58. For example, the status switch 72 can be a simple mechanical device which is physically driven by extension of the fuse indicator rod 58. Alternatively, the status switch 72 can be a more sophisticated device that, for example, electrically or magnetically senses the presence of an extended fuse indicator rod 58. Thus, the present invention is not limited to any particular status switch 72.

Each switch 72 is preferably in electrical communication with a main interrogation port 74 provided on the main body 12 of the junction 10. Such communication can be provided by a printed circuit board 75, hard-wiring or other means known in the art. The interrogation port 74 may include light emitting devices (LEDs) 90 connected to each status switch 72 to provide visual indication of the status of the switch. Alternatively, the interrogation port 74 can be adapted to interface with a circuit detection device for determining the status of each switch 72. The method for interrogation may involve any conventional circuit testing technique to determine which switch 72 has been activated (i.e., has been opened or closed). Moreover, such interrogation may be performed locally on-site, or conventional measures can be provided to allow for remote monitoring. The interrogation port 74 may also include a protective cap 76 attached to the main body 12 with a lanyard 77 and which can be threadably removed as desired to access the interrogation port to determine which fuse 32 has blown.

Referring now to FIGS. 7-10, the junction 10 of the present invention is further preferably provided with a built-in bracket 78, which allows for easy attachment of a specially designed mounting bracket 85 for easy mounting of the junction 10 on existing vault wall brackets 80. In particular, a generally U-shaped metallic bracket 78 is molded within the insulative outer jacket 18 of the junction 10, and preferably includes a plurality of threaded apertures 82 to permit attachment of the bracket 85 with fasteners 84. The bracket 85 is wedge-shaped and includes outwardly extending flanges 86 on its opposite angled sides designed to mount and slidingly lock in place within the wedge-shaped cutouts 88 of the wall bracket 80 without the use of fasteners.

As a result of the present invention a multi-cable junction is provided which allows for simple and easy replacement of fuses 32 without replacing the whole unit. This saves money and time. Only the leg 14*b* that has the blown fuse needs to be serviced, unlike the "crab" system presently used, where all the legs of the crab have to be removed and reconnected. This fuse replacement feature can reduce down time to hours versus days.

Moreover, the contacts 28 and 50 and/or the threaded structure 30, 31, 52 and 54 provided on both the fuse connector 34 and the tap connector 42 allow the lineman to easily replace the fuse 32 by plugging the fuse into tap port 14*b* of the main body 12 and screwing it tight. The tap cable 26 can then be easily plugged into the fuse 32 via the tap connector 42 and screwing the threaded collar 52 tight. Thus, the replacement of the fuse 32 does not require any special tools and does not require any additional preparation of the cable.

Also, the blown fuse indication feature of the present invention gives a true status of the fuse 32. In particular, the mechanical nature of the blown fuse indication causes the indicator switch 72 to change state only when the fuse link is melted. The indicator is not part of the power circuit and, therefore, is not affected by back-feed or parallel paths, which can pose problems with such close proximity multi-cable junction arrangements. The indicator does not rely on sensing voltage or current, thereby eliminates false readings. Moreover, the indicator does not rely on a permanent visual indication that could become covered with dirt or grime that impedes detection.

The interrogation port 74 allows the lineman to interrogate the position of the status switch 72 for each fuse 32 from one location on the main body 12. Additionally, a cable could be attached to the interrogation port 74 and brought to the top of the vault, so that the interrogation could be done from the street level without the need to go into the vault. This interrogation port 74 also allows for means to be added at a later date, so that the interrogation could be done from a remote sight. A tester could be supplied that would plug into the interrogation port 74 that has one LED for each fuse. When an LED is lit, this will indicate a blown fuse and the location of the LED on the tester will tell the operator which fuse is blown.

Thus, the present invention provides a junction which distributes low or medium voltage power from a main feeder cable to multiple cable taps (4, 8 or 12). Each of the cable taps is protected by a fuse. When a fuse blows due to over-current, the device indicates the location of the blown fuse. The method of blown fuse indication is separate from the power circuit, thereby avoiding problems associated with direct measurements to determine if a fuse is open or closed. Such indication can be locally or remotely interrogated. This allows for rapid location for replacement of the blown fuse.

Moreover, the connection between the fuse and the main housing is designed for ease of fuse changeout. Also, to provide electrical insulation and water submersion capability, the main housing is insulated and removable insulated sleeves cover the fuses and their connections.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A multiple fused junction comprising:

a main body having multiple ports extending outwardly therefrom, at least one of said ports being adapted for electrical connection with a feeder cable and another of said ports being a fuse port being adapted to receive a fuse;

said fuse removably connected to said fuse port of said main body, said fuse having an indicator rod movably disposed therein, said indicator rod protruding from an axial end of said fuse into said main body upon electrical interruption of said fuse; and a switch disposed within said main body adjacent said fuse port, said switch being activated by said indicator rod of said fuse upon protrusion of said rod from said fuse to provide indication of electrical interruption of said fuse.

2. A multiple fused junction as defined in claim 1, wherein said main body further includes an interrogation port in communication with said switch and adapted to interface with a detection device for determining a status of said switch.

3. A multiple fused injunction as defined in claim 1, wherein said main body further includes an interrogation port having a light emitting device in communication with said switch for providing visual indication of a status of said switch.

4. A multiple fused junction as defined in claim 1, wherein said fuse port is adapted for removable connection of said fuse without use of tools.

5. A multiple fused junction as defined in claim 1, wherein said main body includes a submersible insulative outer jacket encapsulating an inner conductive shell.

6. A multiple fused junction as defined in claim 5, wherein said outer jacket of said main body comprises a protruding boss portion defining said fuse port, said protruding boss portion including an internal bore to permit access to said switch.

7. A multiple fused junction as defined in claim 6, further comprising an electrically conductive fuse connector disposed within said internal bore of said main body boss portion, said fuse connector being fixed at one end to said inner shell and having an opposite end adapted for removable connection with said fuse.

8. A multiple fused junction as defined in claim 7, wherein said fuse comprises a terminal having said indicator rod axially movable therein and having a threaded portion, and wherein said fuse connector includes an internal bore for receiving said fuse terminal, said internal bore having an internally threaded portion cooperating with said fuse terminal threaded portion for removably attaching said fuse to said fuse connector.

9. A multiple fused junction as defined in claim 8, wherein said fuse connector further comprises at least one electrically conductive annular contact fixed within said internal bore for making electrical contact with said fuse terminal.

10. A multiple fused junction as defined in claim 1, further comprising a tap cable connector having one end fixed to a tap cable and an opposite end removably connected to said fuse, said tap connector permitting removable attachment of said tap cable to said fuse without use of tools.

11. A multiple fused junction as defined in claim 10, wherein said fuse comprises an elongate terminal and said tap connector includes an internal bore for receiving said fuse terminal and at least one electrically conductive annular contact fixed within said internal bore for making electrical contact with said fuse terminal.

12. A multiple fused junction as defined in claim 10, further comprising an insulative tap sleeve substantially encapsulating said tap connector and said fuse port of said main body for providing a water resistant seal therebetween.

13. A multiple fused junction as defined in claim 10, wherein said fuse comprises a terminal having a threaded portion and said tap cable connector comprises a threaded collar adapted for attachment to said fuse terminal threaded portion.

14. A multiple fused junction as defined in claim 10, wherein said fuse comprises a terminal having an arc resistant ring disposed adjacent an end thereof, and said tap cable connector comprises a fuse terminal receiving end adapted to receive said terminal of said fuse, said fuse terminal receiving end including an annular arc contact made from an arc resistant material for cooperating with said arc resistant ring of said fuse terminal to provide arc protection between said fuse and said tap cable connector.

15. A multiple fused junction as defined in claim 1, wherein said main body includes a built-in bracket for mounting to an existing wall bracket.

16. A multiple fused junction as defined in claim 15, wherein said bracket comprises an internal portion fixed within said main body and a mounting portion fixed to said internal portion and extending outside of said main body, said mounting portion being sized and shaped to be mounted to said existing wall bracket without tools.

17. A multiple fused junction as defined in claim 16, wherein said mounting portion of said bracket is wedge shaped and includes outwardly extending flanges disposed on opposite sides thereof for slidingly locking in cutouts formed in said existing bracket.

* * * * *